(12) United States Patent
Sparrevik et al.

(10) Patent No.: US 6,612,397 B2
(45) Date of Patent: Sep. 2, 2003

(54) SHEAR WAVE GENERATOR

(75) Inventors: Per Sparrevik, Oslo (NO); Harald Westerdahl, Dal (NO); Christian Madshus, Oslo (NO)

(73) Assignee: Norges Geotekniske Institutt, Oslo (NO)

( * ) Notice: Subject to any disclaimer, the term of this patent is extended or adjusted under 35 U.S.C. 154(b) by 0 days.

(21) Appl. No.: 10/148,547

(22) PCT Filed: Dec. 8, 2000

(86) PCT No.: PCT/NO00/00423

§ 371 (c)(1),
(2), (4) Date: Jun. 4, 2002

(87) PCT Pub. No.: WO01/51954

PCT Pub. Date: Jul. 19, 2001

(65) Prior Publication Data

US 2002/0181330 A1 Dec. 5, 2002

(30) Foreign Application Priority Data

Dec. 10, 1999 (NO) .......................................... 19996149

(51) Int. Cl.$^7$ .......................... G01V 1/053; G01V 1/00
(52) U.S. Cl. ........................ 181/120; 181/401; 367/75
(58) Field of Search .......................... 367/75; 181/119, 181/120, 401, 113

(56) References Cited

U.S. PATENT DOCUMENTS

| 4,334,592 A | 6/1982 | Fair |
| 4,442,916 A | 4/1984 | Fair |
| 4,705,137 A | 11/1987 | Fair |
| 4,959,818 A | * 9/1990 | Cole ........................ 181/401 |
| 5,000,285 A | 3/1991 | Airhart |
| 5,128,900 A | 7/1992 | Cole |

FOREIGN PATENT DOCUMENTS

| WO | WO 98/13707 A1 | 4/1998 |

* cited by examiner

*Primary Examiner*—Ian J. Lobo
(74) *Attorney, Agent, or Firm*—Rothwell, Figg, Ernst & Manbeck, p.c.

(57) ABSTRACT

A seismic shear wave generator comprising a seismic wave source (3) arranged on a base plate (11) arranged for being placed at the seabed, and a coupling device (1) arranged for coupling the wave source (3) mechanically to the seabed in order for shear waves to be transmitted to the seabed. The novelty of the invention is as follows: a cylindrical skirt (1) closely arranged along the base plate's (11) circumference and extending down from the underside of the base plate (11), and open downwards, and a pump device (2) arranged for pumping water respectably out of, and into, the skirt (1) and form vacuum or overpressure, respectively, in a closed cavity formed by the skirt (1) and the base plate (11) and the seabed (1) is lowered onto the seabed. By means of the device mentioned above the shear wave generator may be suctioned fixed to the sea bed and thus transfer shear waves via the skirt (1) to the seabed.

10 Claims, 4 Drawing Sheets

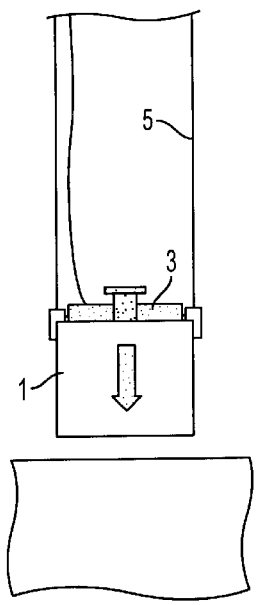
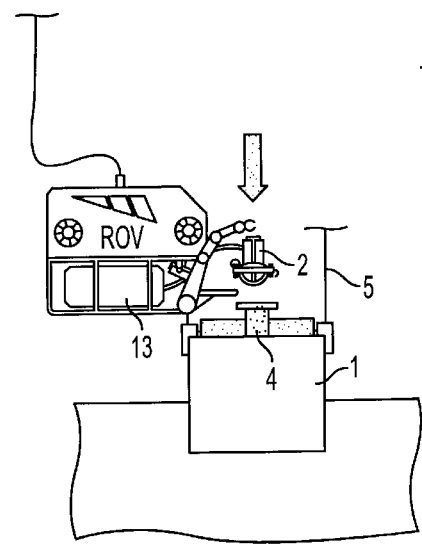
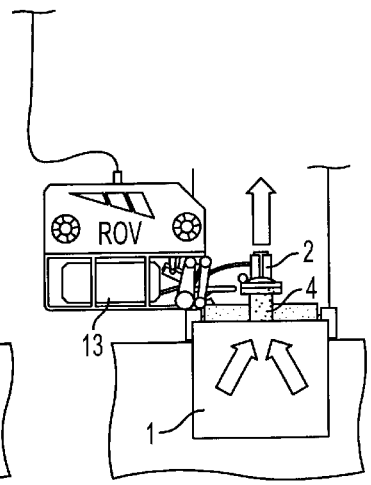
FIG. 8  FIG. 9  FIG. 10
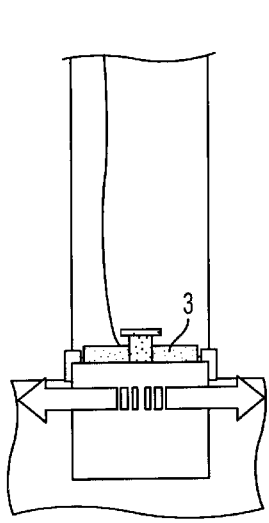
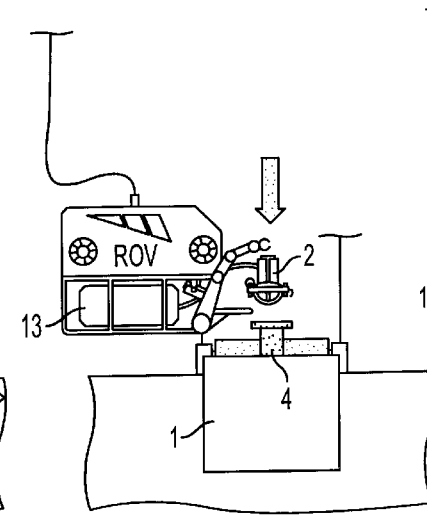
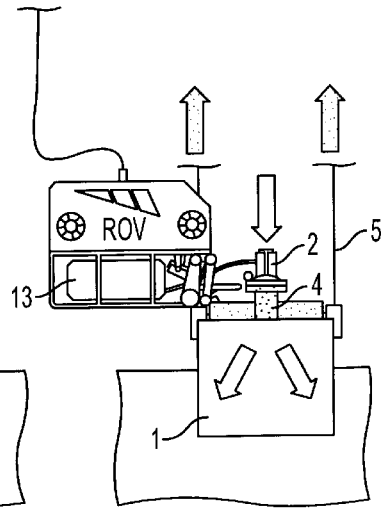
FIG. 11  FIG. 12  FIG. 13

SHEAR WAVE GENERATOR

This application relates to a seismic sea bed source arranged for generating shear waves.

More particularly it relates to a device for coupling a shear wave generator in a releasable way to a sedimentary sea bed.

KNOWN ART IN THE FIELD

U.S. Pat. No. 4,705,137 "Marine Shear Vibrator" describes a subsea vibrator apparatus for generating a shear wave into the consolidated sea bed, with a house, a horizontally arranged mass attached to the house for movement along an axis being mainly parallel to the earth's surface, and hydraulic apparatus for oscillating the mass along the axis. In essence the entire vibrator house comprises a sidewall and a bottom. The sidewalls and the bottom form a tapered surface with an angular surface of the tapered surface transversal to the mass' movement, so that the mass oscillates the subsea vibrator against the consolidated bottom, where the vibrator will sink and settle into the sea bed. However, the vibrator will maintain contact with the bottom even though the consolidated bottom yields under the vibrated weight.

U.S. Pat. No. 5,128,900 describes a method and an apparatus for generating elliptically polarized shear waves in marine environments with a shear wave source penetrating surface sediments in the sea bed and comprises a double actuator/reaction mass system mounted inside a structural ring of a conical house. A cross structure on top of the apparatus serves as a passive reaction mass and as a moment arm support for reversibly motor driven propellers in sleeves arranged at the outer ends of the cross structure. The cross structure and the house is connected with a structurally rigid member like a vertical pipe. Pistons provide actuation of two reaction masses inside the house, and the movements of the reaction masses generate shear movements propagating into the subsurface formations.

PROBLEMS RELATED TO THE KNOWN ART

Two essential problems are related to the known art:

a) To obtain sufficient coupling between the shear wave source and the consolidated sediments. This is Particularly related to soft sediments in the sea bed surface, with the sediments constituted by organic sediments, gyttja, mud, unconsolidated clay and other unconsolidated sediments having very low density compared to the underlying more consolidated sedimentary sea bed. This incurs an inferior transmission of the vibrators movements into seismic waves.

b) To release the shear wave source from the consolidated sediments. U.S. Pat. No. 4,705,137 will have a large surface which easily will stick firmly in the sea bed after vibration, requiring large forces to release from the sea bed. U.S. Pat. No. 5,128,900 will incur a risk of becoming stuck in the sea bed if it obtains a good fix, and may sink deeper into the sediments during vibration.

c) To achieve a uniform coupling to the sea bed during the entire vibration time. The two U.S. patent may sink deeper into the sediments during the seismic signal generation because they are given a wedge-shape penetrating into the sea bed and with vibration both being a means for attaching the signal source and also for generating the seismic signal. This may incur uncertainty during the interpretation of the seismic signal because one may not, to a sufficient degree, control the seismic characteristics of the source.

SOLUTION TO THE STATED PROBLEM, SUMMARY OF THE INVENTION

A solution to the above mentioned problems is a seismic shear wave generator comprising a seismic source arranged on a base plate, for being arranged in a working position at the sea bed, and a coupling device arranged for coupling the wave source mechanically to the sea bed so that shear waves can be transmitted to the sea bed, with the coupling device comprising a cylindrical skirt arranged closing along the periphery of the base plate and extending downwards from the underside of the base plate, and open downwards, and a pumping device arranged for pumping water out of, or into the skirt, respectively, through the base plate to form underpressure, or possibly overpressure in a closed cavity being delimited by the skirt, the base plate and the sea bed, when the skirt is lowered to or entirely or partially penetrated into the sea bed.

SHORT FIGURE CAPTION

The FIGS. 8–13 illustrate an alternative method A according to the invention with the water pump and power unit 2 being independent and e.g. being carried and operated by a submersible vessel 13.

DETAILED DESCRIPTION OF THE EMBODIMENTS OF THE INVENTION

Figure 1A:
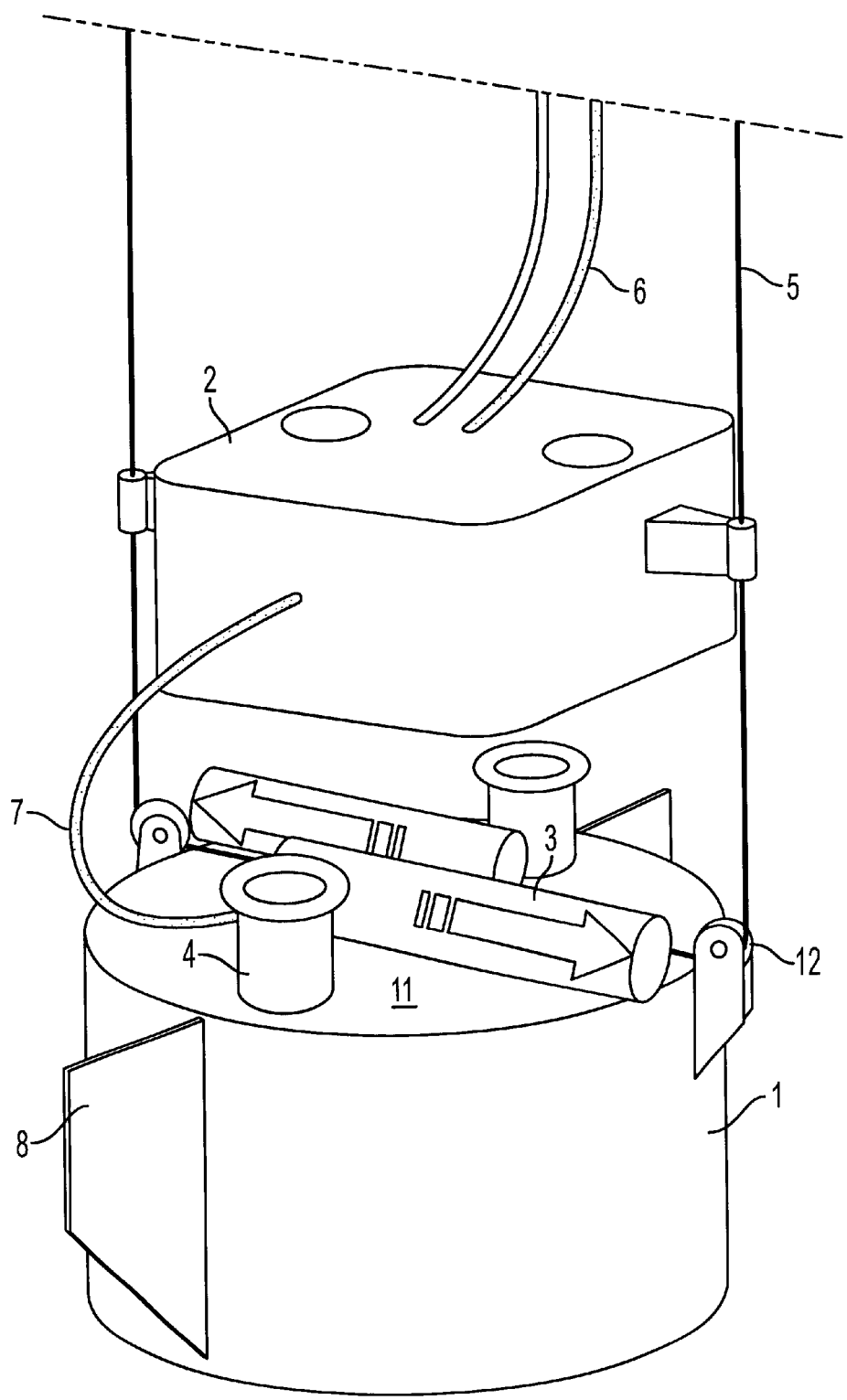
FIG. 1a is a perspective view of a seismic sea bed source arranged on a coupling device according to the invention arranged for coupling the seismic signals to the sea bed.
Figure 1B:
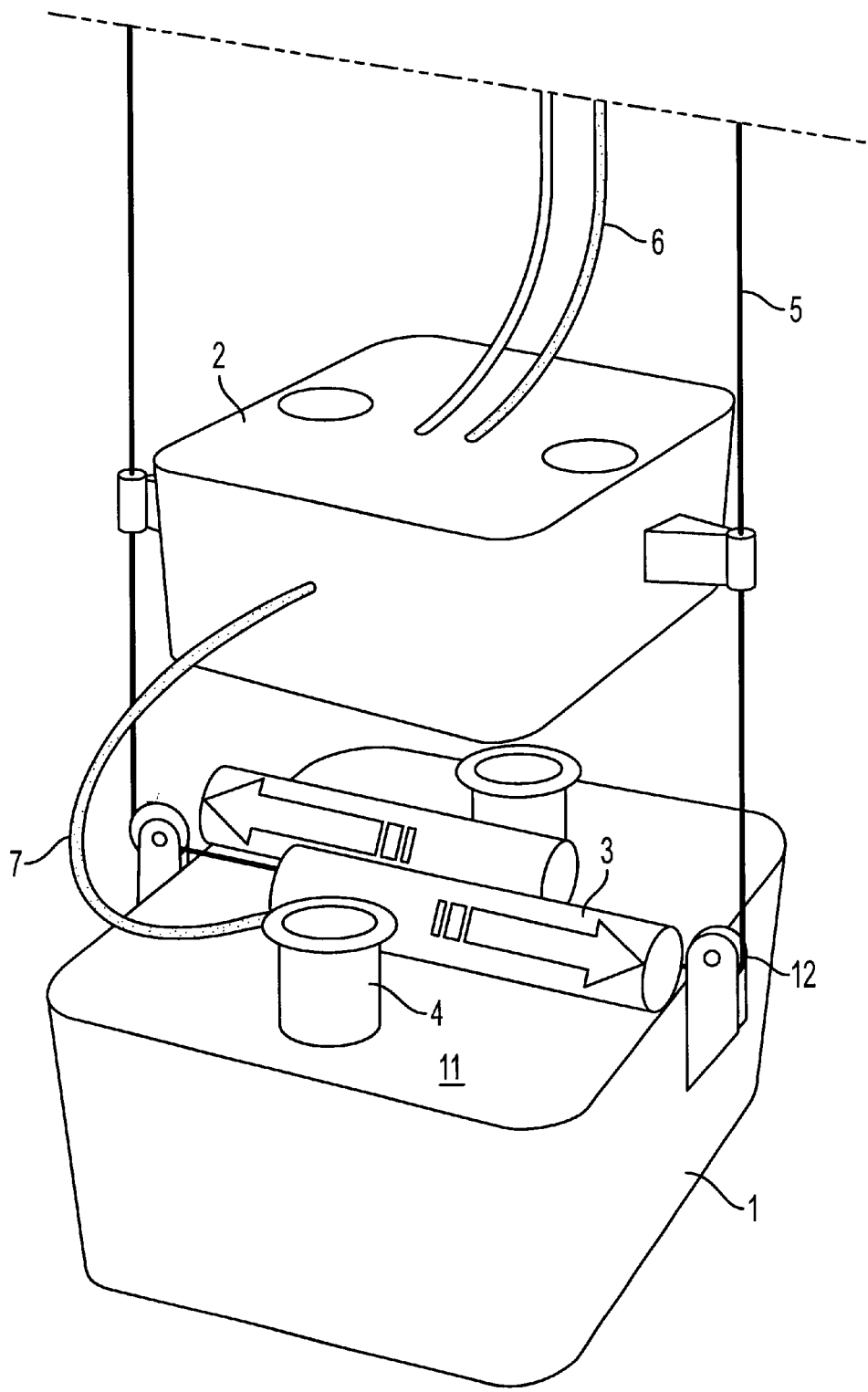
FIG. 1b illustrates a corresponding seismic signal transmitter having additional fins or wings on the coupling device for improved coupling of the seismic signal.

A preferred embodiment of the invention is illustrated in FIGS. 1a and 1b and comprises a seismic signal generator 3 arranged on a coupling device 1 arranged for suctioning into the sea bed sediment and unconsolidated masses. The coupling device 1 is constituted by a preferably metallic skirt 1 constituting the side surface of a cylinder or box being open in the one lower end arranged to penetrate downwards into sediments of the sea bed, and which in the opposite, upper end is closed by a closure 11 having a valve through arranged for being connected to a water pump- and power unit 2. One or more carrier wires 5 hold the skirt by extending eyelets or sheaves 12. The pump 2 may be arranged vertically mobile along the carrier wires 5, for guiding while connecting and disconnecting from the coupling device 1. The water pump/power unit 2 may alternatively be carried and operated by means of a semisubmersible vessel (ROV) 13. One of the advantages of such an arrangement is that the pump 2 does not vibrate together with the seismic signal source 3 when the source 3 is activated.

A signal umbilical 6 exchanges energy and control signals from a vessel, normally a vessel on the surface, or a submersible vessel. A signal- and energy conductor 7 is connected between the water pump- and power unit 2 to the seismic signal source 3. The seismic signal source may be of electrical, hydraulic or pneumatic type as known in the art.

Wings 8 may be arranged on the suction penetrating skirt 1 to prevent rotation and to increase the coupling surface towards the sea bed, for improved transmission of vibrations to seismic waves.

Figure 2:
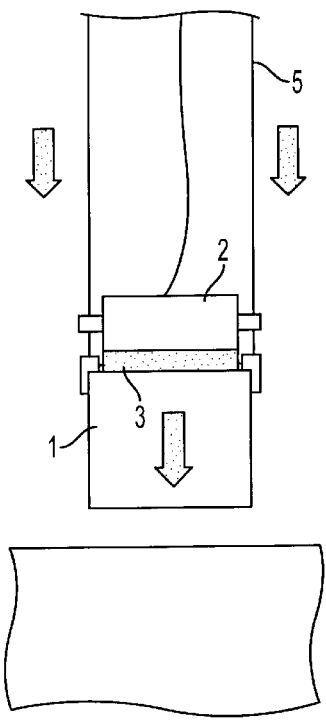
FIG. 2 illustrates the first part of the method according to the invention, with the coupling device being lowered towards the sea bed for penetration into the sea bed sediments.

The method for using the device is as follows;

FIG. 2 illustrates the first part of the method according to the invention, with the coupling device 1 being lowered on the wires 5 towards the sea bed for penetrating into the sea bed sediments.

Figure 3:
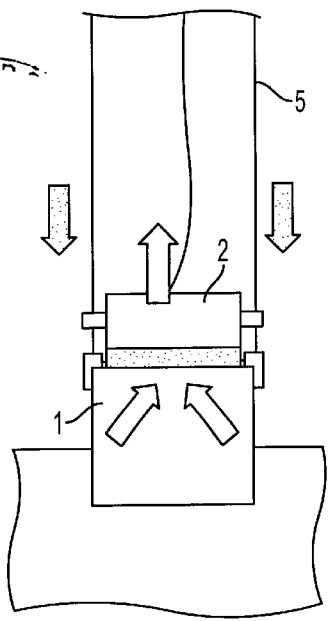
FIG. 3 illustrates how trapped water is being pumped out of the coupling device which thereby penetrates deeper down into the sea bed sediments by means of suction.

FIG. 3 describes how entrapped water is being pumped out of the coupling device 1 which thus penetrates deeper into the sea bed sediments by means of suction.

Figure 4:
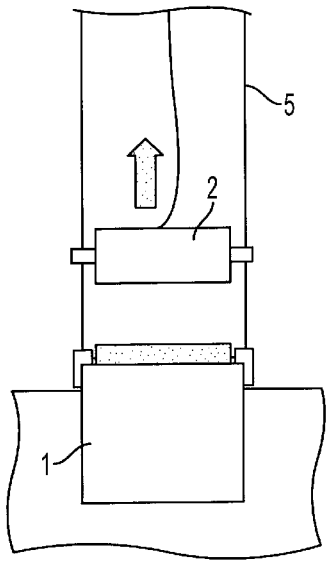
FIG. 4 illustrates how a pump unit is released in order for the coupling device and the seismic signal source are left and remain coupled to the sea bed.

FIG. 4 describes how the pump unit 2 is disconnected and elevated along the wires 5 in order for the coupling device 1 and the seismic signal source 3 being left remaining coupled to the sea bed.

Figure 5:
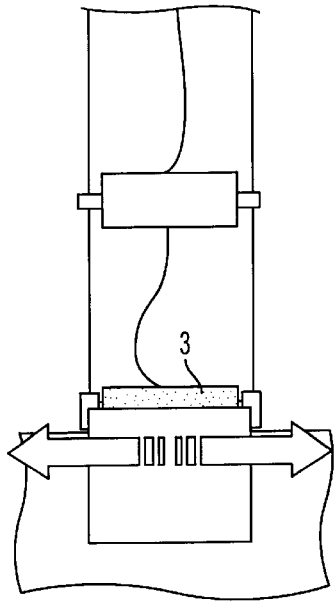
FIG. 5 shows that the seismic signal source is activated and generates shear waves being transmitted via the coupling device and propagate in the sea bed. These seismic shear waves may be linearly polarized or circularly polarized.

FIG. 5 illustrates that the seismic signal source 3 is being activated and generating shear waves which are transmitted via the coupling device 1 and propagating in the sea bed. These seismic shear waves may be linearly polarized or circularly polarized.

Figure 6:
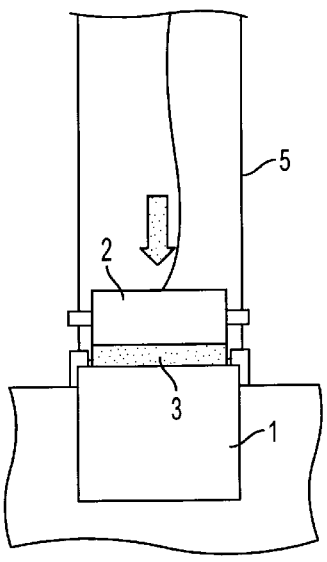
FIG. 6 illustrates the pump returning to the coupling device before the release of the source from the sea bed.

FIG. 6 illustrates the pump 2 being lowered on the wires 5 and returning for connecting with the pipe hub 4 on the coupling device 1 before release from the sea bed.

Figure 7:
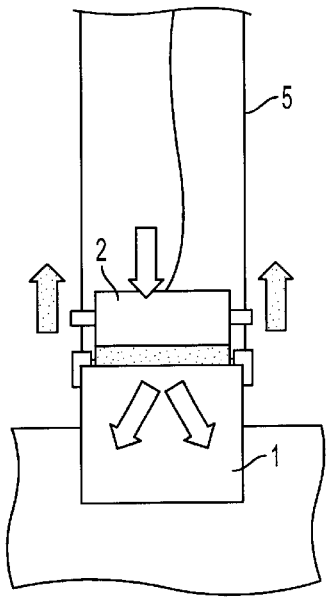
FIG. 7 illustrates that the pump pumps water into the coupling device and thereby increases the pressure inside the coupling device so that it is pushed up from the sediments and thus released from the sea bed, and becomes ready for being displaced away from the locality of where the seismic signal was generated in the sea bed.

FIG. 7 illustrates the pump 2 pumping water into the coupling device 1 so that it is being pushed up from the sediments and released from the sea bed, and is ready to be lifted by the wires 5 and transported away from the locality where the seismic signal was generated into the sea bed.

FIGS. 8 to 13 show an alternative method according to the invention with the water pump and power unit 2 being independent and e.g. being carried and operated by means of a semisubmersible vessel 13.

FIG. 8 corresponds to FIG. 2.

In FIG. 9 tension release of the carrier wires S and coupling of the pump unit 2 onto the pipe hub 4 by means of an ROV 13 is illustrated.

FIG. 10 corresponds to FIG. 3. The pump unit 2 is disconnected and lifted away by means of the ROV 13.

In Pig. 11 the seismic source (3) is started.

In FIG. 12 is illustrated connecting of the pump unit 2 to the pipe hub 4 by means of ROV 13.

FIG. 13 corresponds to FIG. 7.

What is claimed is:

1. A seismic shear wave generator device having a seismic source (3), a base plate (11) for being arranged proximate a sea bed, and a coupling device (1) arranged for coupling the wave source (3) mechanically to the sea bed so that shear waves may be transmitted to the sea bed, comprising:

a coupling device (1) having a generally vertical skirt (1) around a perimeter of a base plate (11) and extending downwards from the underside of the base plate (11), the skirt having a height and being open downwards;

a pump device (2) configured to pump water out of or into the skirt (1), respectively, from or to an enclosed cavity beneath the base plate (11), to form an underpressure or overpressure, respectively, in said cavity, forming a suction anchor delimited by the skirt (1), the base plate (11), and the sea bed when the skirt (1) is lowered to entirely or partly penetrate the sea bed, so as to suction the coupling device of a desired depth before activating the seismic source for generating seismic shear waves, and to release the coupling device from the seabed before moving the seismic shear generator to another location;

a valve (4) in the base plate (11) configured to releasably connect with the pump device (2), the pump device (2) being adapted to be separated from the base plate (11) with the seismic wave source (3) and the skirt (1) when the seismic source (3) is activated.

2. The device according to claim 1, further including carrier wires (5) extending upward above the base plate (11), for lifting, holding or lowering the coupling device (1).

3. The device according to claim 2, further including the pump device (2) being vertically displaceable on the carrier wires (5).

4. The device according to claim 1, farther including the pump device (2) being arranged maneuverable by means of an ROV (13) or being independently maneuverable.

5. The device according to claim 1, further including a signal- and energy umbilical cable (6) arranged for exchanging control signals and energy between the device and a vessel.

6. The device of claim 5, wherein said vessel is a surface vessel.

7. The device according to claim 1, further including the umbilical cable (6) extending between the vessel and the pump device, and that the pump device (2) includes energy accumulating devices and control devices for the seismic wave source (3).

8. The device according to claim 7, further including a signal- and energy conductor (7) extending from the pump device (2) to the seismic signal source (3).

9. A method for generating seismic shear waves, comprising:

arranging a seismic signal source (3) coupled to a base plate (11) having a downwardly extending skirt coupling device (1) on the sea bed for penetrating sea bed sediments;

pumping entrapped water out of the coupling device (1), which thereby penetrates deeper into the sea bed sediments by a suction force arising;

activating the seismic signal source (3) and generating shear waves which are transmitted via the coupling device (1) and propagated in the sea bed; and after having generated shear waves, pumping water into the coupling device (1) so that it is pressed up from the sea bed as a result of an overpressure arising and becomes released from the sea bed, for repeating the method on other seabed locations.

10. The method according to claim 9, further includes releasing a pumping unit (2) from the seismic signal source (3) such that the coupling device (1) and the seismic signal source (3) remain coupled to the sea bed.

* * * * *